Feb. 18, 1941.     E. A. TUBBS     2,231,971

SYNCHRONIZING SYSTEM FOR PICTURE TRANSMISSION

Filed April 6, 1933     6 Sheets-Sheet 1

INVENTOR.
ERNEST A. TUBBS
BY
ATTORNEYS.

Feb. 18, 1941.  E. A. TUBBS  2,231,971
SYNCHRONIZING SYSTEM FOR PICTURE TRANSMISSION
Filed April 6, 1938   6 Sheets-Sheet 2
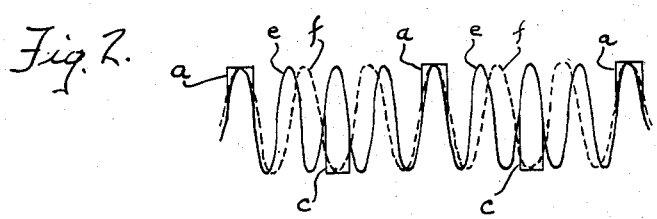
Fig. 2.
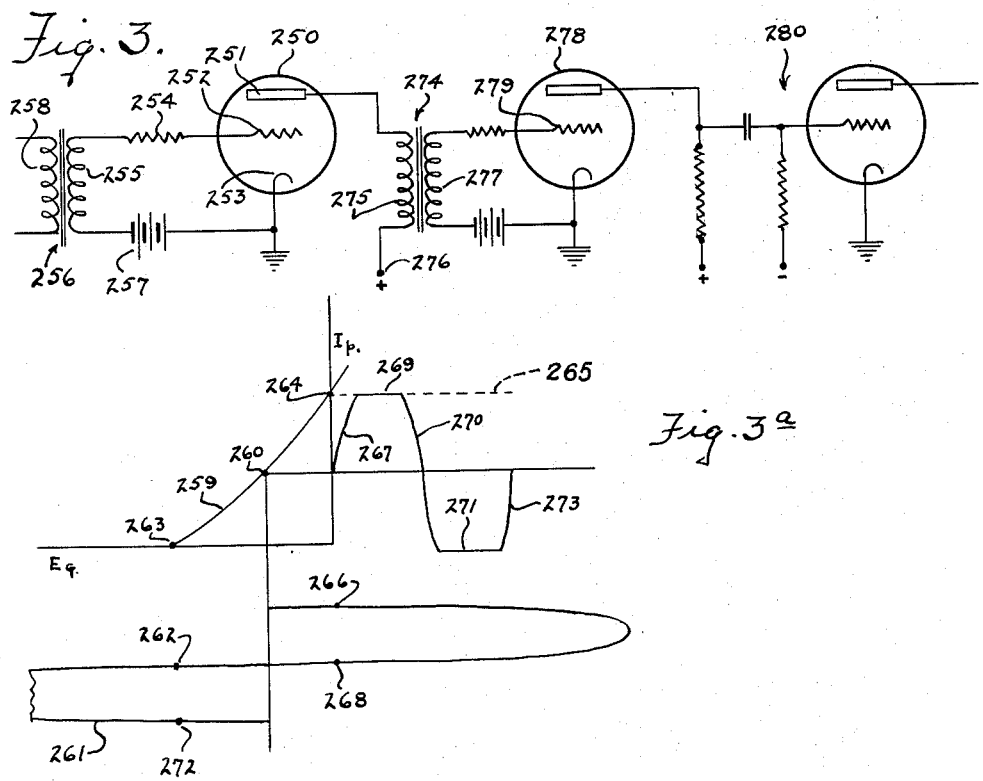
Fig. 3.
Fig. 3a.
INVENTOR.
ERNEST A. TUBBS.
BY
ATTORNEYS.

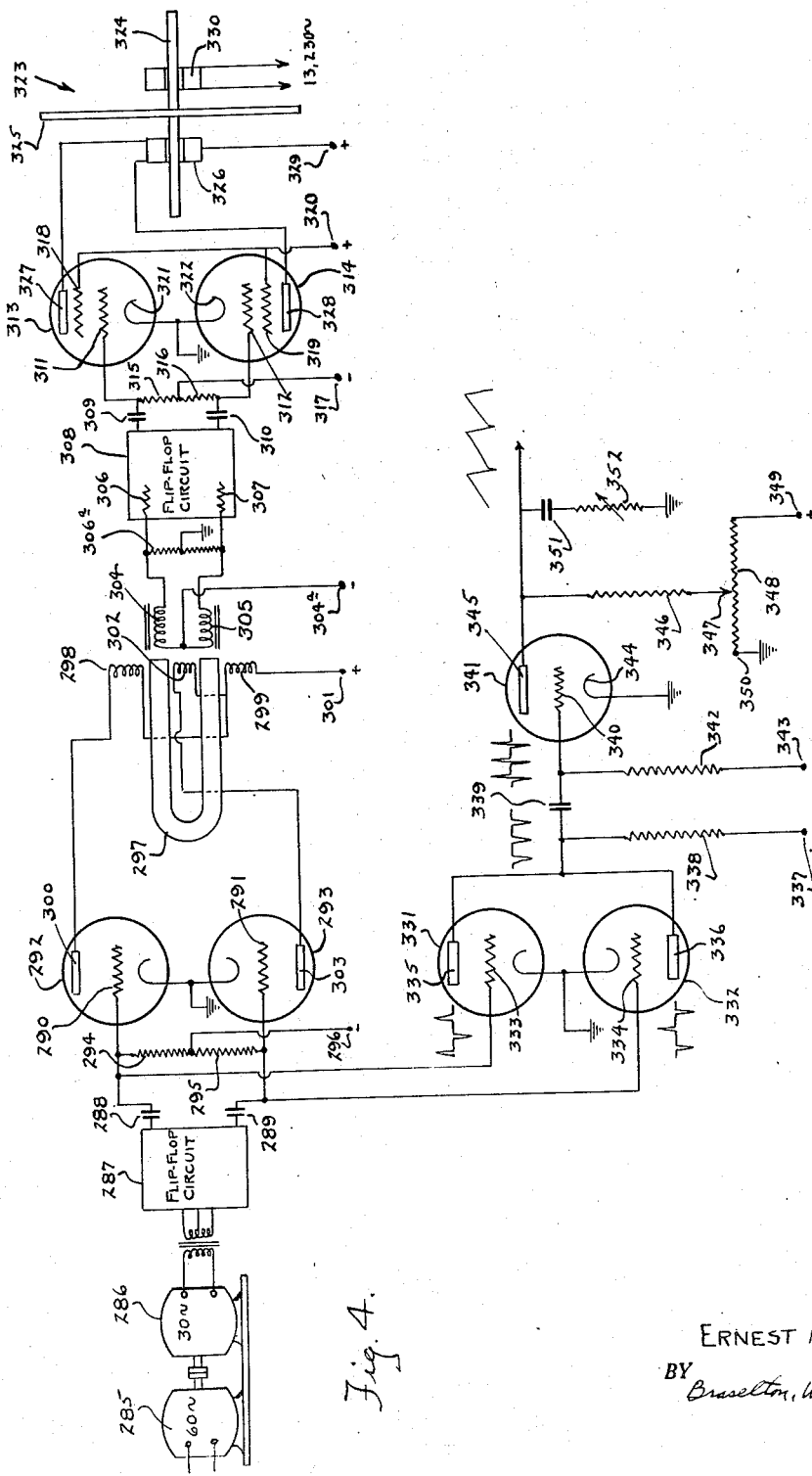

Feb. 18, 1941.   E. A. TUBBS   2,231,971
SYNCHRONIZING SYSTEM FOR PICTURE TRANSMISSION
Filed April 6, 1938   6 Sheets-Sheet 5

INVENTOR.
ERNEST A. TUBBS
BY
ATTORNEYS.

Feb. 18, 1941.  E. A. TUBBS  2,231,971
SYNCHRONIZING SYSTEM FOR PICTURE TRANSMISSION
Filed April 6, 1938  6 Sheets-Sheet 6
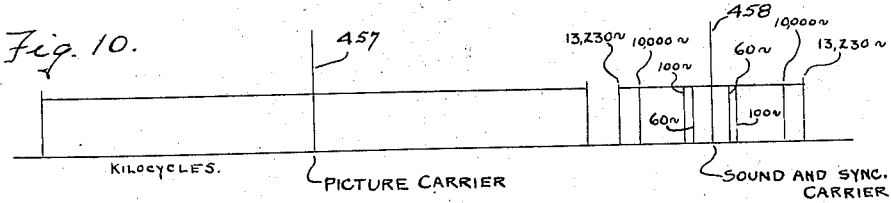
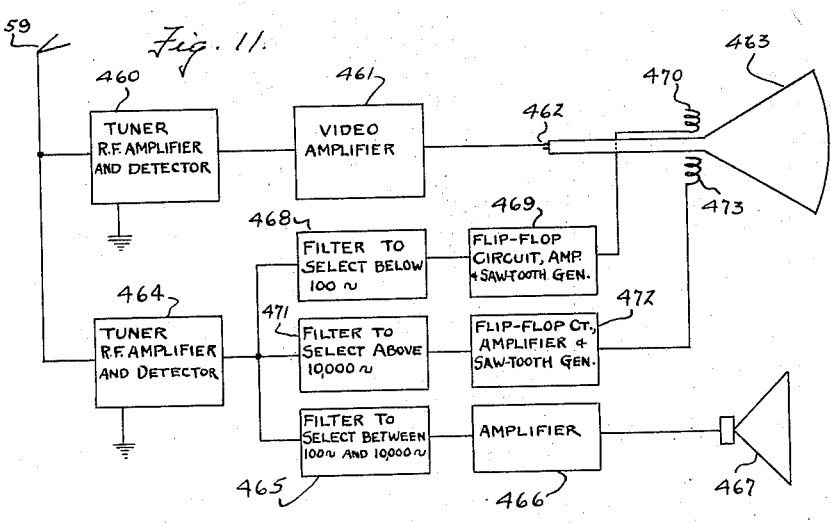
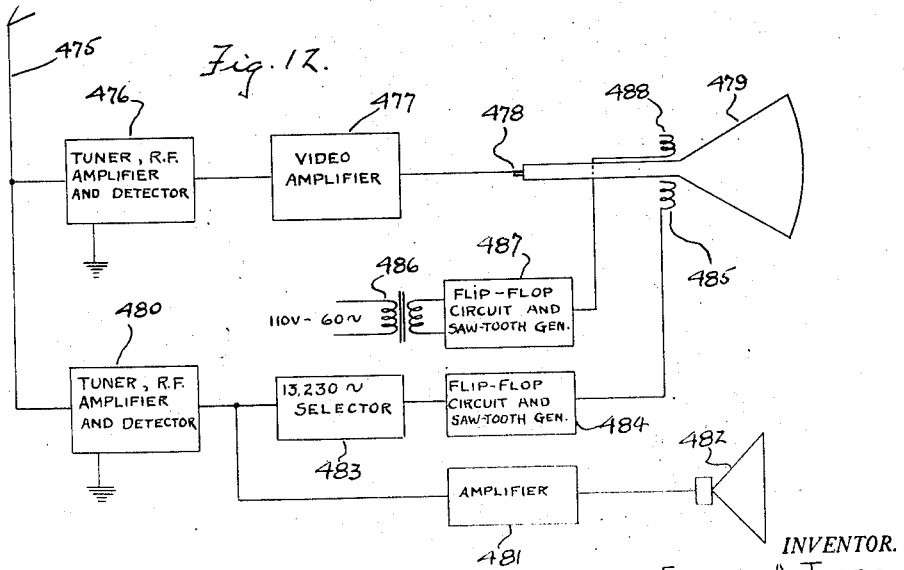
INVENTOR.
ERNEST A. TUBBS
BY
ATTORNEYS.

Patented Feb. 18, 1941

2,231,971

UNITED STATES PATENT OFFICE 2,231,971

SYNCHRONIZING SYSTEM FOR PICTURE TRANSMISSION

Ernest A. Tubbs, Long Island City, N. Y., assignor to National Television Corporation, Wilmington, Del., a corporation of Delaware Application April 6, 1938, Serial No. 200,339

18 Claims. (Cl. 178—5.6)

This invention relates to picture transmission, and especially to a synchronizing system for controlling and timing the various impulses for the production of a picture both at the transmitter and at the receiver.

An object of the invention is to provide a synchronizing signal generator for producing the frequencies necessary for scanning control and locking these frequencies with respect to each other.

Another object of the invention is to provide independent phasing controls for the various impulses necessary for cathode ray scanning.

Another object of the invention is to provide a synchronizing signal generator for producing the various impulses necessary for the control of scanning in a cathode ray tube and locking such impulses with the alternating current power supply.

Still another object of the invention is to provide a synchronizing signal generator with a rotating initiating member.

Another object of the invention is to provide a system of scanning control in which substantially sine wave oscillations are transmitted from a synchronizing signal generator to the various pieces of apparatus at which point the controlling impulses are created.

Another object of the invention is to provide a synchronizing system for television transmission which uses positively driven circuits to produce the necessary controlling signals and does not depend on synchronized oscillators.

Another object of the invention is to provide a synchronizing system for television transmission which permits greater flexibility of receiving apparatus so that such apparatus may respond to signals representing different scanning rates and different numbers of lines.

Another object of the invention is to provide a synchronizing control for a television receiver.

Still another object of the invention is to provide a system of television transmission in which the synchronizing signal may be sent as part of the sound accompaniment.

Another object of the invention is to provide a television system in which the synchronizing signals may be transmitted in the form of substantially pure sine waves.

Another object of the invention is to provide a television system whereby synchronizing may be accomplished by means of the power line.

Other objects and objects relating to the various circuits and the manner of interconnecting them will be apparent as the description of the invention proceeds.

The invention is illustrated in the accompanying drawings, in which—

Fig. 1a is a diagram illustrating certain impulses which are produced in the circuit of Fig. 1;

Fig. 2 is a diagrammatical representation of certain impulses which may be produced by variations of the circuit of Fig. 1;

Fig. 3 is a circuit diagram of a modified form of one of the flip-flop circuits of Fig. 1;

Fig. 3a is an operating curve therefor;

Fig. 4 is a circuit diagram of a modified form of the complete synchronizing signal generator of Fig. 1;

Fig. 10 is a diagrammatical representation of a television transmission in which the synchronizing signal is mixed with the sound accompaniment for the picture;

Fig. 11 is a block diagram of a receiver for receiving the transmission of Fig. 10; and Fig. 12 is a block diagram of a modified form of receiver.

In all television systems some means is necessary to control the speed of the scanning apparatus at the receiver so that it is exactly the same as that of the transmitter and so that a point on the picture at the receiving end will correspond to exactly the same point on the picture at the transmitting end. When the speed is the same, the two scanning devices are said to be "in synchrony"; when they are also maintained in the same relative position they are said to be "in isochrony."

In addition to the above synchronizing requirement the horizontal and vertical scanning frequencies must have a very definite and constant relationship to each other in order to faithfully produce the so-called "interlaced pattern," where each line of one scanning of the picture falls between two adjacent lines of the next succeeding scanning of the picture.

Also in television systems using a cathode ray scanning device at the transmitting end it is necessary to produce certain signals or impulses to control and properly utilize the movement of the beam of electrons which sweeps across the light sensitive mosaic. For instance it is necessary to produce a saw-tooth wave at the picture frequency to control the vertical movement of the beam and a saw-tooth wave at the line frequency to control the horizontal movement of the beam. In addition, it is desirable to produce a blank-out impulse to remove the signal entirely when the electron beam is retracing its path after it has swept across the light sensitive mosaic and another blank-out impulse to remove the signal when the electron beam has reached the lowermost edge of the light sensitive mosaic and is caused to move to the uppermost edge again.

The former of these blank-out impulses usually occupies about one-tenth of the time required to scan once across the picture, while the latter blank-out impulse usually requires about one-tenth of the time for the picture to be completely scanned. It is highly desirable in such a television system to control the phasing of the saw-tooth waves with respect to each other as well as the width of the blank-out impulses and their phasing with respect to each other and to the saw-tooth waves.

Figure 1:
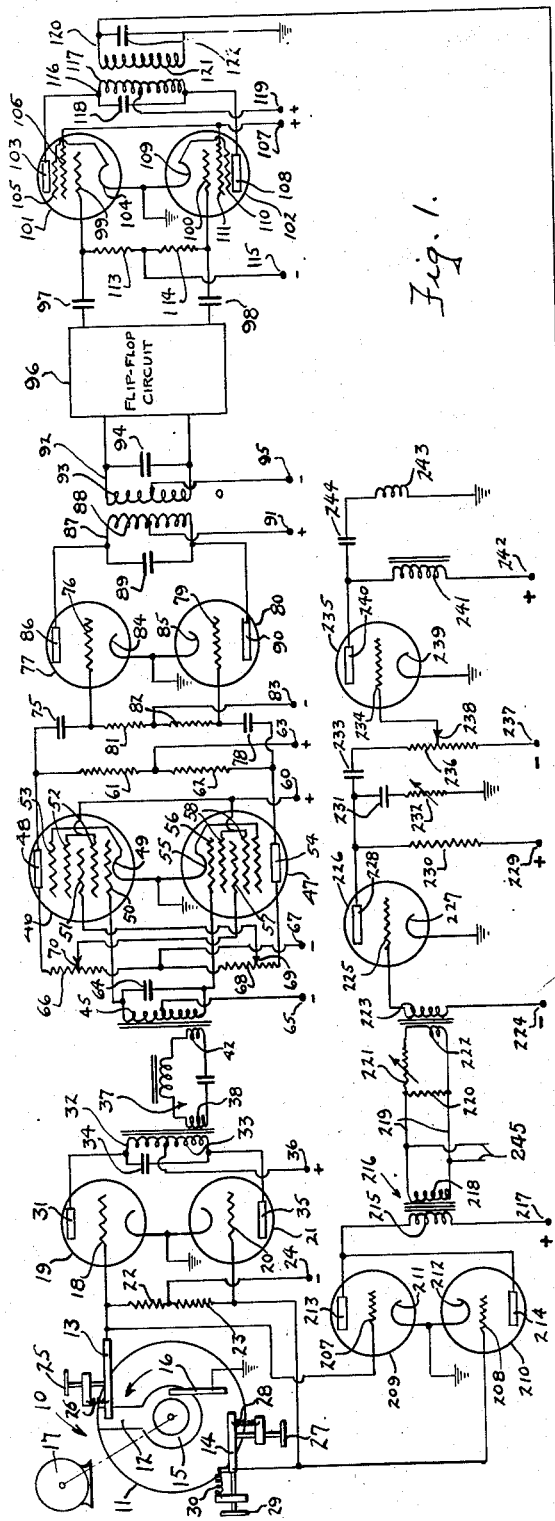
Fig. 1 is a circuit diagram of one form of improved synchronizing signal generator for a television transmitter.

A feature of the present invention, therefore, is a synchronizing signal generator which will accomplish the results mentioned above in an extremely positive and easily controlled manner. The circuit is shown in Fig. 1, where, in order to initiate the various signal impulses necessary, and to lock those impulses in with the sixty cycle alternating current power source, I may provide a rotary impulse generator 10 comprising a disc 11 having a conductive segment 12 against which a pair of diametrically opposite brushes 13 and 14 may bear so that as the disc rotates in a counter-clockwise direction, as indicated by the arrow, the segment 12 passes first under the brush 13, and then after rotating 180°, under the brush 14. The segment 12 on the disc 11 may be connected to a slip ring 15 which may be engaged by a brush 16 connected to ground, thus grounding the segment 12 at all times.

In order to maintain constant the speed of the rotary signal generator, I may rotate the disc 11 by means of a synchronous motor 17 which, in the arrangement illustrated, may be an 1800 R. P. M. motor operated on the sixty cycle alternating current power line. This means that the disc 11 is rotating thirty times per second and that therefore the segment 12 passes each brush at 30 times a second, and as the brushes are spaced 180° apart the segment makes contact with a brush sixty times a second.

The brush 13 may be connected to the grid 18 of a thermionic tube 19, while the brush 14 may be connected to the grid 20 of a thermionic tube 21, these grids also being connected, respectively, through resistances 22 and 23 to a source of negative potential, indicated at 24. Normally the negative potential is applied to both grids 18 and 20 through the resistances, but when one of the brushes is in contact with the segment 12, the associated grid will be at ground potential. Thus the grids 18 and 20 are alternately grounded, each for a period equal to the time that its associated brush is in contact with the segment.

By providing a segment of a predetermined width, therefore, the period of grounding the grids may be accurately determined. In the present instance, and for the particular frequencies desired in the example described, I preferably make this segment slightly less than one-eighteenth of the circumferential line on the disc at the point of contact of the brushes. The actual size of this segment should be determined by the angle of rotation during which the brush is in contact with the segment, and therefore, inasmuch as the brush must have some width at its contacting surface, the segment may necessarily be slightly less than the measurement given.

For reasons to be explained later, I may prefer to have this rotary impulse generator produce very accurate impulses, and, in order to do this, I may provide adjusting means to control the position of the brushes with respect to the segment 12. Thus an adjusting screw 25 may move the brush 13 against the tension of the spring 26 so that the contacting edge of the brush may be adjusted radially of the disc between the center and the circumference thereof. In the same manner an adjusting screw 27 may function against the tension of the spring 28 to move the brush 14 in a radial direction. An additional adjusting screw 29 may also be provided for the brush 14 to act longitudinally of the brush against the tension of the spring 30, so that the contacting surface of the brush 14 may be moved not only radially of the disc 11 but also through a limited distance at right angles to a radial line to adjust the angular separation of the brushes. The complete details of the adjusting mechanism have not been illustrated inasmuch as any suitable means may be employed to accurately move these brushes in the directions indicated, and such means would be well within the knowledge of one skilled in the art.

The anode 31 of the tube 19 may be connected to one side of a resonant circuit 32, comprising a coil 33 and condenser 34, and the anode 35 of the tube 21 may be connected to the opposite side of this resonant circuit. The midpoint of the coil 33 may be given a positive potential, as indicated at 36, thus providing the operating potential for the anodes of the two tubes. The resonant circuit 32 in the present instance may be tuned to a frequency of 270 cycles per second, which is a ninth harmonic of the thirty impulses produced by the disc 11.

The grid 18 is grounded at thirty times per second, as has already been mentioned, when the segment 12 passes under the brush 13. The grid 20 is grounded once between every two groundings of the grid 18, and inasmuch as the tubes are connected in push-pull, the impulses on the two grids produce sixty impulses per second in the resonant circuit 32, alternate impulses being in the opposite direction with respect to the resonant circuit.

In Fig. 2 the solid lines a and c represent the signals on the grids 18 and 20 of Fig. 1 as they are effectively applied across the tuned circuit 32. The impulses a and c are applied to the tuned circuit in opposite directions, the impulses a being produced by the tube 19 while the impulses c are produced by the other tube 21. It is well understood in the art that such a wave as represented by the impulses a and c will contain a large percentage of certain harmonics of the thirty cycle fundamental, including the ninth, which, in the present instance, is especially desired.

The curve $e$, shown in full lines, is intended to represent the sine wave of an even harmonic of the fundamental 30 cycle frequency, and from an inspection of Fig. 2 it will be seen that all of the impulses $a$ come in the right direction to aid in the production of this harmonic. However, the impulses $c$ are in a direction opposed to the direction of the even harmonic oscillations corresponding in time to these impulses, and hence tend to completely counteract the even harmonics so that they are greatly decreased, if not entirely eliminated.

The resonant circuit 32, being sharply tuned to a ninth harmonic of the thirty initiating impulses, will easily select this odd harmonic and will oscillate at 270 cycles per second, which frequency will be locked to the power line frequency through the action of the synchronous motor. The oscillations of 270 cycles may then be used to initiate other impulses corresponding to the impulses produced by the wheel but at a ninth harmonic higher.

In order to select out this ninth harmonic and eliminate the other harmonics which are present, I may use some form of selective circuits, such as the chain of three tuned coupled circuits including the circuit 32, another tuned circuit 37, coupled thereto by means of the small coil 38, and a third tuned circuit 45 which may be coupled to tuned circuit 37 by means of the small coil 42 included in that circuit. Across this last tuned circuit 45 we then have substantially a sine wave of 270 cycles which may be applied to what I have termed a "flip-flop circuit."

This flip-flop circuit in the arrangement above has two tubes 46 and 47. The tube 46 may have an anode 48, a cathode 49, a first control grid 50, a second control grid 51, isolated from the other electrodes by the screen grids 52 which may be connected together, and a suppressor grid 53 which may be connected to the cathode 49. The tube 47 may have an anode 54, a cathode 55, a first control grid 56, a second control grid 57, isolated from the other electrodes by the screen grids 58 which may be connected together, and a suppressor grid 59 which may be connected to the cathode 55.

The screen grids 52 and 58 are shown connected together and provided with a positive potential, as indicated at 60. The anodes 48 and 54 may be connected through resistances 61 and 62, respectively, to a source of positive potential, indicated at 63.

The tuned circuit 45 which is tuned to a frequency of 270 cycles per second may be connected to the grids 50 and 56 of the tubes 46 and 47, while the midpoint of the circuit may be given a negative potential, as indicated at 65.

I may also connect the anode 48 through a resistance 66 to a source of negative potential, indicated at 67, and I may also connect the anode 54 through a similar resistance 68 to the same source of negative potential 67. I then connect the second control grid 51 of the tube 46 to a point 69 on the resistance 68 which may have substantially ground potential or which may be slightly negative. Similarly, I may then connect the second control grid 57 of the tube 47 to a point 70 on the resistance 66 which may have substantially ground potential or which may be slightly negative.

The operation of the flip-flop circuit just described has certain important effects with respect to the production of the signals for controlling the television apparatus which will be hereinafter described. The circuit operates on a discontinuity principle. That is, the current in the output circuit is alternately at a maximum or a minimum, under control of the voltage wave applied to grids 50 and 56, and the change from the maximum to the minimum is substantially instantaneous. Therefore, the circuit may act like the rotary signal generator 10 to create impulses in the output circuit of the device which contain harmonics of the initiating frequency so that oscillations at a harmonic frequency may be produced. The circuit is subject to many variations, some of which will be later described, but that shown in Fig. 1, as comprising tubes 46 and 47, and the immediately associated circuits, may be preferred under certain circumstances to produce the desired result.

In the operation of this flip-flop circuit let us assume that the potential of the grid 50 of the tube 46 is changed in the negative direction. This will reduce the anode-cathode current of this tube with the result that the potential of the anode is increased. Increase of the potential of the anode 48 will cause the potential of the second control grid 57 of the tube 47 to change in a positive direction as these electrodes are galvanically connected through a portion of the resistance 66.

The change toward the positive of the potential of the second control grid 57 of the tube 47 will tend to increase the anode-cathode current of this tube with the result that the potential on the anode 54 will decrease. The anode 54 is, however, galvanically connected to the second control grid 51 of the tube 46 through a portion of the resistance 68, and hence this control grid 51 will change in potential in the negative direction. This in turn tends to reduce the anode-cathode current of the tube 46 which tends to increase the anode-cathode current of tube 47, and the effect is cumulative so that instantaneously, or substantially so, the tube 46 will have a minimum of anode-cathode current and the tube 47 will have a maximum.

If, now, the control electrode 50 of the tube 46 has its potential changed in the positive direction, then the anode-cathode current of this tube will increase and the anode-cathode current of the tube 47 will decrease, the cumulative effect producing a substantially instantaneous reversal of the operation of these tubes so that the anode-cathode current of tube 46 is increased to a maximum while the anode-cathode current of tube 47 is decreased to a minimum.

The above explanation could have been made with respect to grid 56 instead of grid 50, either of these grids being usable for an input signal. It should be noted, however, that with the tubes connected in push-pull, the action is symmetrical and I find this connection preferable when it is desired to substantially eliminate the even harmonics present in the output.

The change from one condition of operation to the other may be made to occur at any predetermined value of potential of the input grids 50 and 56 by suitably biasing these grids. If, for instance, a sine wave is introduced to the grids 50 and 56 in the manner of a push-pull input circuit, wherein one grid is changing in the positive direction while the other grid is changing in the negative direction, the instantaneous change may be caused to occur at any predetermined part of the sine wave. The flip-flop circuit of tubes 46 and 47, therefore, produces a square-topped wave similar to the rotary generator 10, but as the initiating frequency is 270 cycles per second, the square-topped wave will have that frequency.

The anode 48 of the tube 46 may be connected through a condenser 75 to the grid 76 of a tube 77, while the anode 54 of the tube 47 may be connected through a condenser 78 to the grid 79 of a tube 80, these grids being connected respectively through resistances 81 and 82 to a source of negative potential, indicated at 83. The cathodes 84 and 85, respectively, of the tubes 77 and 80 may be connected together and to ground as indicated. The anode 86 of the tube 77 may be connected to one side of a resonant circuit 87 which may comprise a coil 88 and a condenser 89, and the anode 90 of the tube 80 may be connected to the opposite side of this resonant circuit, the midpoint of the coil 88 being connected to a source of positive potential indicated at 91.

As before, the square-topped wave is composed of numerous harmonics of the fundamental, and hence I may tune the resonant circuit 87 to a frequency corresponding to one of these harmonics, and inasmuch as the circuit is connected in push-pull, the odd harmonics will predominate, as previously explained, in connection with Fig. 2. With the arrangement illustrated, I have tuned the resonant circuit 87 to 1890 cycles per second, which is a seventh harmonic of the initiating frequency of 270 cycles per second. In order to make impulses corresponding in time duration to the half cycle of the desired oscillation I may desire to produce an effect on the square-topped wave, which approaches differentiation.

In Fig. 1a I have indicated the square-topped waves 48a and 54a found in the circuits of the anodes 48 and 54 respectively. The differentiating effect then produces the impulses indicated respectively at 76a and 79a.

In the present instance I have accomplished this purpose by properly choosing the values of the condensers 75 and 78 and resistors 81 and 82. When the capacities of these condensers have been made suitably small (i. e. large reactance) and the resistors have been given a suitable small value, I obtain the sharp impulses indicated, and I may then preferably keep the tubes biased below cut-off by means of the negative source of potential 83, so as to prevent damping of the resonant circuit 87. All of the impulses in this resonant circuit are then in the proper direction for the oscillations at 1890 cycles per second.

A second resonant circuit 92 may be coupled to the resonant circuit 87 and may comprise a coil 93 inductively coupled to the coil 88 and a condenser 94 shunted across the coil. The midpoint of the coil 93 may be connected to a source of negative potential, indicated at 95. This coil may also be tuned to 1890 cycles per second, and acts to further discriminate against undesired harmonics.

The ends of the resonant circuit 92 may be connected to the input grids of another flip-flop circuit 96, which may be similar in every respect to the flip-flop circuit comprising the tubes 46 and 47 and therefore need not be described in detail. The output of the flip-flop circuit 96 may be connected through condensers 97 and 98 to the control grids 99 and 100 of two screen grid tubes 101 and 102.

The tube 101 may have an anode 103, a cathode 104, a suppressor grid 105 connected to the cathode, and a screen grid 106 which may be given a positive potential from a source indicated at 107. Similarly, the tube 102 may have an anode 108, a cathode 109, a suppressor grid 110, which may be connected to the cathode, and a screen grid 111 which may be given a positive potential from a source indicated at 107. The control grids 99 and 100 may be connected, respectively, through resistances 113 and 114 to a source of negative potential indicated at 115.

The square-topped wave produced by the flip-flop circuit 96, which will be at a frequency of 1890 cycles per second, may then be differentiated by the condensers 97 and 98 and the resistances 113 and 114, so that impulses similar to those indicated at 76a and 79a of Fig. 1a will be introduced to the grids of these tubes.

The anodes 103 and 108 may be connected to opposite ends of a resonant circuit 116 which may comprise a coil 117 and a condenser 118 shunted across it. The midpoint of the coil 117 may be given a positive potential, as indicated at 119. For the same reasons already mentioned, this resonant circuit may be tuned to an odd harmonic of the fundamental frequency of the flip-flop circuit 96, and hence, in the present instance, I have tuned this resonant circuit to 13,230 cycles per second, which is the seventh harmonic of the flip-flop circuit frequency of 1890 cycles per second.

Another resonant circuit 120 having a coil 121 and condenser 122 may be inductively coupled to the coil 117. One end of the circuit 120 may then be connected to the grid 123 of a tube 124. The cathode 125 of the tube 124 may be connected to ground through a resistance 126 which may be shunted by a condenser 127. The other end of the resonant circuit 120 may also be connected to ground. Thus the oscillations of 13,230 cycles are impressed on the grid 123. This frequency of 13,230 cycles per second is the frequency corresponding to the number of lines per second of a television picture having 441 lines of interlaced scanning at 30 complete frames per second, and hence I may desire to lead the oscillations at this frequency from the synchronizing signal generator to some remote point where the television transmitter is located, so that these oscillations may be used to create the saw-tooth waves necessary for producing the horizontal lines on the cathode ray camera tube.

In order to conveniently convey these oscillations to more remote points, the anode 128 of the tube 124 may be connected through the primary 129 of a transformer 130 to a source of positive potential indicated at 131. The secondary 132 of this transformer may be connected to a line 133 which may lead to a point remote from that part of the signal generator already described.

At the other end the line 133 may be connected across a primary 134 of a transformer 135, the secondary 136 of which may be connected to a phasing network for adjusting the phase of the oscillations as desired. This phasing network may comprise a variable resistance 137 and a condenser 138 in series with the coil 136, the midpoint of the coil 136 being connected to a source of negative potential, indicated at 139, and to the juncture of the condenser 138 and resistance 137 through another resistance 140. When the values of the resistance 137 and condenser 138 are properly chosen, adjustment of the value of the resistance will cause a shift in the phase of the voltage wave developed across the resistance 140.

In order to make a saw-tooth wave at a frequency of 13,230 cycles I may use these oscillations to initiate the operation of a flip-flop circuit, similar to one of the flip-flop circuits already described. However, this flip-flop circuit may operate under certain conditions with a single tube instead of the two tubes as shown in the previous circuits, and in the present instance I have shown a single multi-grid tube 141 connected in such a manner as to produce the discontinuity action already described in connection with the previous flip-flop circuits. This tube may have a control grid 142 which may be connected to a point 143 on the resistance 140 so that a predetermined amplitude of the voltage oscillations across this resistance may be applied to the grid.

The tube 141, in addition, may have an anode 144, a cathode 145, a suppressor grid 146, which may be connected to the cathode, a flip-flop output grid 147, a flip-flop input grid 148, and a screen grid 149. The anode 144 may be given a positive potential from a source indicated at 150 through a resistance 151. The screen grid 149 may be given a positive potential from a source indicated at 152. The flip-flop output grid 147 may also be given a positive potential from a source indicated at 153 through a resistance 154. This grid may also be connected through a large resistance 155 to a source of negative potential indicated at 156. The input flip-flop grid 148 may be directly connected to a point 157 on the resistance 155 which has a substantially ground potential or which may be slightly more negative than ground. This provides a galvanic connection between the flip-flop output grid 147. The cathode 145 may be connected to ground.

In the operation of this flip-flop circuit, the values of the various components of the circuit may be adjusted so that when the potential of the control grid 142 reaches a predetermined value, in the course of change in a given direction, the anode-cathode current of the tube will instantaneously change to a predetermined value. The action of this flip-flop circuit, as will be seen, is similar to that already described in connection with the others, except that a single tube is used.

The oscillations applied to the input grid 142 are therefore caused to create a square-topped wave in the anode circuit of the tube. This wave may then be differentiated in a manner already described, by connecting the anode 144 through a condenser 158 to the grid 159 of a tube 160, the grid also being connected through a high resistance 161 to a source of negative potential, indicated at 162. The values of the condenser 158 and resistance 161 may be such as to cause the differentiation action as already described to produce a sharp impulse on the grid 159 at each break of the square-topped wave. The negative potential on the grid 159 may be such that the grid is biased to cut-off, or in other words to such an extent that the tube will respond only to positive impulse, so that the negative impulses produced on the grid by the differentiation action are eliminated.

The tube may have an anode 163, a cathode 164, which may be connected to ground, and a screen grid 165, which may be given a positive potential from a source indicated at 166. The anode 163 may be given a positive potential through a resistance 167, and this potential may be made variable by connecting the end of the resistance 167 to a movable contact 168 operating on a resistance 169, one end of which is connected to the source of positive potential, indicated at 170, the other end 171 being grounded. Movement of the contact arm 168 will change the potential on the anode 163.

A condenser 172 may have one end connected to the anode 163 and the other end connected through a resistance 173 to ground, and the arrangement of this tube with the condenser 172 is such as to create a saw-tooth wave from the impulses introduced to the grid of the tube. The saw-tooth is made in the following manner: As the grid 159 of the tube is maintained normally at cut-off there will be substantially no anode-cathode current in the tube and hence the condenser 172 will be gradually charged through the resistance 167 and a part of the resistance 169 by the source of potential 170. The rate of charge of this condenser will follow approximately a straight line and the condenser will continue to charge until one of the positive impulses is applied to the grid 159. When a positive impulse is applied to the grid 159 the tube becomes conductive and the condenser 172 will discharge through the anode-cathode circuit of the tube, whereupon the impulse is removed from the grid, the grid swings to cut-off again, and the condenser 172 starts to charge again.

This intermittent gradual charging and sudden discharging of the condenser produces the saw-tooth wave which may then be applied through a condenser 174, connected to the anode 163 of the tube, to the grid 175 of another tube 176, the grid 175 also being connected to a source of negative potential, indicated at 177, through a resistor 178. The resistance 173, as is well known, is used to help shape the saw-tooth wave. The tube 176 may have a cathode 179 which may be connected to ground, a screen grid 175a with a source of positive potential, indicated at 176a an anode 180 which may be connected to a source of positive potential, indicated at 181, through the primary 182 of a transformer 183. A secondary 184 of the transformer may be directly connected across the horizontal deflecting coil 185 which is to be applied to the cathode ray tube for guiding the electron beam.

Care should be taken in the design of the transformer 183 in order to pass the saw-tooth wave through it without distortion. Some distortion may however be produced. Such distortion may be greatly reduced or eliminated by the use of a wave shaping network which may comprise the resistance 186 and the condenser 187 connected in series with each other and across the primary 182 of the transformer.

It is desirable in producing a cathode ray television picture to provide certain signal correcting waves, such as blanking-out impulses, which remove the signal during the period that the cathode ray beam is retracing its movement across the picture field.

In order to obtain the oscillations for controlling or creating the blanking-out impulse I may connect another tube 188 with its input circuit in parallel with the input circuit of the tube 124. The control grid 189 of this tube may therefore be connected directly to the control grid 123 of the tube 124. The oscillations at a frequency of 13,230 cycles will then be impressed upon the grid 189. The tube 188 may have an anode 190 and a cathode 191, the latter being connected to ground through a resistor 191b shunted by a condenser 191a. The anode 190 may be given a positive potential, as indicated at 192, through the primary 193 of a transformer 194, the secondary 195 of which may be connected across a line 196 to lead this frequency to some remote part of the transmitting station.

The other end of the line 196 may be connected to the primary 197 of a transformer 198, the secondary 199 of which may be connected to a phase controlling network which may comprise the variable resistance 200 and the condenser 201 connected in series with each other and across the secondary 199. The midpoint of the secondary 199 may be given a negative potential as indicated at 202, while the juncture of the condenser 201 and resistance 200 may be connected to the same source of negative potential through a resistance 203. The voltage variations at 13,230 cycles across the resistance 203 may then be shifted in phase through a rather large angle by adjustment of the resistance 200.

The oscillations produced across the resistance 203 may be transferred to a flip-flop circuit 204, which has not been shown in detail because it may be identical to the flip-flop circuit of the tube 141, and the amplitude of the oscillations taken from the resistor 203 may be adjusted by means of a movable contact 205 engaging that resistance. The flip-flop circuit 204 acts to make a square-topped wave out of the oscillations applied to it, and this square-topped wave may then be applied to the blanking-out amplifier 206, which may be arranged in a known manner to reshape the square-topped waves in such a manner as to provide the necessary width of blanking-out impulse to eliminate from the signal the return trace of the cathode ray beam at the end of each line, and also to eliminate undesirable transients which may be developed because of the rapid changes of the horizontal deflection saw-tooth wave. These blanking-out impulses may be applied to the signal at any desirable point between the camera tube itself and the transmitter. Other signal correcting waves may be similarly made and properly controlled as to time by connection of suitable circuits using tubes with inputs connected in parallel with the tubes 124 and 188. Certain of these circuits will be subsequently explained.

The synchronizing signal generator may also be used to control the vertical deflection of the cathode ray beam, and for this purpose a saw-tooth wave at 60 cycles per second is desired. This may be formed in the following manner: The brushes 13 and 14 on the rotary impulse generator 10 may be connected respectively to the grids 207 and 208 of two tubes 209 and 210 which may have their cathodes 211 and 212 connected together and to ground. The anodes 213 and 214 of these tubes may also be connected together and to one end of the primary 215 of transformer 216, the other end of the primary being connected to a source of positive potential, indicated at 217.

The transformer 216 may be specially designed to pass a wide enough band of frequencies for a sixty cycle square-topped wave. The secondary 218 of this transformer may then be connected across a line 219 which may lead to some point remote from the synchronizing signal generator where the camera tube is set up.

The end of the line 219 may be terminated by a resistance 220 connected across the line and a variable resistance 221 in series with the output coil 222 which may be used to inductively transfer variations in the coil to a second coil 223. This coil may have one end connected to a source of negative potential, indicated at 224, and the other end connected to the grid 225 of an amplifying tube 226.

The resistance 221 at the end of the line is made very large with respect to the impedance of the coil 222 so that differentiation takes place, with the result that sharp impulses are delivered to the grid 225. The cathode 227 of this tube may be grounded and the anode 228 may be connected to a source of positive potential, indicated at 229, through a resistance 230. For making the saw-tooth wave, a condenser 231 may have one end connected to the anode 228 and the other end connected to ground through a resistance 232.

The negative potential 224 on the grid 225 of the tube may be such that the tube is operating at cut-off and therefore only the positive impulses applied to the grid will operate the tube. The saw-tooth wave is then made in exactly the same manner as has already been described in connection with the 13,230 cycle saw-tooth.

The saw-tooth wave thus produced may then be transferred by means of the condenser 233 to the grid 234 of another tube 235. In order to be able to adjust the amplitude of the signal applied to the grid 234 I may connect a resistor 236 between the condenser 233 and a source of negative potential, indicated at 237. A movable contact arm 238 may then be connected between the grid 234 and the resistance 236. The tube 235 may have a cathode 239, which may be connected to ground, and an anode 240 which may be connected through a choke 241 to a source of positive potential, indicated at 242. The saw-tooth wave may then be applied to the vertical deflecting coil 243 by means of a condenser 244, the other end of the coil 243 being connected to ground.

The line 219 which leads the sixty cycle square-topped wave from the synchronizing signal generator to the point where it is used may have other branches leading from it, as indicated at 245, so that wherever a sixty cycle wave is necessary in the system it may be obtained at this point.

I have shown in Fig. 1 a rotary signal generator for producing a square-topped wave which is used with my system of synchronizing signal generation. I have also shown flip-flop circuits used in various stages of the synchronizing signal generator of Fig. 1 which also produce square-topped waves by the electronic discontinuity action. It will be understood that a flip-flop circuit may also be used to produce the square-topped wave which the rotary apparatus produces in Fig. 1.

Any other method of producing a discontinuity action may be used with the invention. Such a method, which may produce a wave closely approaching a square-topped wave may be accomplished by means of a tube which is greatly overloaded by the input signal. A circuit for using a tube in this manner is illustrated in Fig. 3 where the tube 250 may have an anode 251, a control grid 252, and a cathode 253. The control grid 252 may be connected through a resistance 254 to one end of the secondary 255 of a transformer 256, the other end of the secondary being connected through a suitable biasing battery 257 to the cathode 253 and to ground. The primary 258 of the transformer 256 may be connected to some suitable source of oscillations at the predetermined desired frequency. The resistance 254 is provided to give poor regulation to the input circuit, if the transformer secondary is not sufficient for that purpose, so that the potential of the grid will change whenever there is grid current, owing to the drop through the resistance.

The curve 259, representing the grid-potentials plotted against plate-current values is also shown immediately below the tube in Fig. 3a, and the battery 257 or other source of negative potential is such that the tube is biased at a point 260 on the curve. The signal on the grid of the tube may then be made greatly in excess of the normal signal for the tube. Such a signal is illustrated by the sine wave 261 which is laid out about a vertical line including the bias point 260 on the curve. When the grid swings negative the plate current will reach a minimum when the voltage on the grid has reached a point 262 corresponding to the point 263 where the curve intersects the base line. When the grid is changed in the positive direction to such a point 264 on the curve where it will begin to draw grid current, the effective grid-voltage, plate-current curve flattens out horizontally as indicated by the dotted line 265. Therefore, when the grid potential sine wave 261 has reached a point 266 on the sine wave which corresponds with the point 264 on the curve, the plate current of the tube will not further increase. If the plate current curve is then laid out on the horizontal line intersecting the bias point 260 on the curve 259, the plate current will rise in a sine wave indicated at 267 until the voltage on the grid sine wave reaches a point 266, at which time the plate current will remain constant until the grid sine wave has reached a point 268 on its return in the negative direction, thus forming a substantially flat top 269.

At this point, however, the plate current wave will move down, following a sine wave to form the portion 270, and will continue to move down until the point 262 corresponding to cut-off is reached on the grid voltage wave, at which point the plate current has reached a minimum and the flat portion 271 is formed. When the grid voltage wave has reached a corresponding point 272 going in the positive direction, the plate current wave will rise again in a sine wave, forming the portion 273.

It will be seen that the anode current of the tube 250 will then produce a sine wave with the peaks of the wave cut off in substantially flat lines. This wave may then be passed through a transformer 274 having a primary 275 which may have one end connected to the anode 251 and the other end connected to a source of positive potential, indicated at 276. The transformer 274 may have a secondary 277 which may be connected to a second tube 278, the input circuit for that tube being exactly the same as the input circuit for the tube 250.

The tube 250 not only cuts off the peaks of the wave but amplifies the signal, and hence the voltage impressed on the grid 279 of the tube 278 may be greatly in excess of the normal voltage swing for that tube. Hence the tube 278 does exactly the same thing that the tube 250 does and cuts off the peaks of the amplified wave. This increases the slope of the wave and the process may be repeated in several stages if desired, until the slope of the wave closely approximates a vertical line. The substantially square-wave thus formed may then be differentiated by the circuit 280, which may be the same as the differentiating circuits already described, and the pulses produced may be used in the same manner as has already been described.

In Fig. 4, another arrangement of my improved synchronizing signal generator is shown in which a synchronous motor 285, adapted in this present instance to run at a predetermined synchronous speed on the sixty cycles alternating current, is directly connected to a generator 286 which is designed to produce oscillations at thirty cycles when driven by the synchronous motor 285. The oscillations of thirty cycles may then be applied to a flip-flop circuit 287 which may be similar to the push-pull flip-flop circuits already described, and the square-topped waves produced by this flip-flop circuit may be applied through condensers 288 and 289 respectively, to the grids 290 and 291 of tubes 292 and 293. Resistors 294 and 295 may be connected respectively between grids 290 and 291 and a source of negative potential, indicated at 296.

The values of the condensers and resistors just mentioned may be such as to differentiate the waves to form the sharp impulses, the negative cycles of which may be eliminated by an adjustment of the source of potential 296 to bias the tube at cut-off. The tubes 292 and 293 may then be used to drive a tuning fork 297 which is tuned to an odd harmonic of the thirty cycle generator, as, for instance, the twenty-first harmonic, or 630 cycles. The tuning fork may be driven in any desirable way, as, for instance, by means of the two coils 298 and 299, positioned at the outside of the tines of the fork, and connected in series with each other between the anode 300 of the tube 292 and a source of positive potential, indicated at 301. A coil 302 may be provided between the tines of the fork, which may be connected between the anode 303 of the tube 293, and the source of positive potential 301.

Whenever current flows in the anode circuit of the tube 292 the tines of the fork are pulled outwardly, while current in the anode circuit of the tube 293 tends to pull the tines of the fork together. A pair of pick-up coils 304 and 305, positioned at the ends of the tines, may be connected in series, between the grids 306 and 307 of a flip-flop circuit 308. The juncture of these coils may be connected to a source of negative potential, indicated at 304a, and a resistor 306a may be connected between the grids with its mid-point grounded. The flip-flop circuit, by its discontinuity action, as already described, may change the sine wave produced by the coils 304 and 305 when the tuning fork vibrates, to a square-topped wave which will have a frequency of 630 cycles per second, the same frequency as the fork. The square-topped wave produced by the push-pull flip-flop circuit may then be applied through coupling condensers 309 and 310 to the grids 311 and 312, of two tubes 313 and 314 respectively.

Resistances 315 and 316 may be connected between the grids 311 and 312 and a source of negative potential, indicated at 317. The values of the condensers and grids just mentioned may be chosen so as to differentiate the square-topped waves creating impulses as indicated, which will be applied to the grids of the tubes, and the negative potential 317, may be chosen so as to bias these tubes to cut-off and thus eliminate the negative impulses. The tubes 313 and 314 may preferably be screen grid tubes provided, respectively, with screens 318 and 319, which may be connected to a source of positive potential, indicated at 320. The cathodes 321 and 322 of the tubes 313 and 314, respectively, may be connected together and to ground.

The impulses above produced in the anode circuits of the tubes 313 and 314 may then be used to drive a magneto-striction device 323. This device may comprise a bar 324 of magnetic material, such as invar, rigidly mounted at its center in a shielding plate 325, the bar extending out equally on each side of the plate. A coil 326 of wire may be positioned around one end of the bar at a point about one-quarter of the distance from the plate to the end of the bar, and one end of this coil may be connected to the anode 327 of the tube 313, while the other end may be connected to the anode 328 of the tube 314. A center tap on the coil 326 may be connected to a source of positive potential, indicated at 329. The sharp impulses produced by the tubes 313 and 314 and flowing through the coil 326 will cause the bar 324 to vibrate at its period of vibration, which may, in the present instance, be fixed at 13,230 cycles. Whereupon a driven coil 330, spaced around the opposite end of the bar at about one-quarter of the distance from the plate 325 to the end bar, will have the 13,230 cycles induced in it and the ends of this coil may then be connected to a saw-tooth-making circuit, as described in connection with Fig. 1.

The differentiated output of the flip-flop circuit 287 at thirty cycles per second may also be used to produce the sixty cycle saw-tooth wave for the vertical deflection of the cathode ray tube, and to this end tubes 331 and 332 may have their input circuits connected in parallel with the tubes 292 and 293. Thus the grid 333 of the tube 331 may be connected directly to the grid 290 of the tube 292, and the grid 334 of the tube 332 may be connected directly to the grid 291 of the tube 293, and the same impulses as applied to the grids of the tubes 292 and 293 will therefore be applied to the grids of the tubes 331 and 332.

The anodes 335 and 336 of the tubes 331 and 332 may then be connected together and to a source of positive potential, indicated at 337, through a resistance 338. The parallel connection of the anodes 335 and 336 will cause all the impulses produced by these tubes to be in the same direction (negative) as indicated by the diagram adjacent these parallel anode circuits, and these impulses may be transferred through a condenser 339 to the grid 340 of a tube 341, a resistance 342 being also connected between the grid 340 and a source of negative potential 343, which may be sufficient to maintain the tube 341 at cut-off. The values of the condenser 339 and resistance 342 may then be chosen so as to differentiate the impulses produced by the tubes 331 and 332, and as the tube 341 is maintained at cut-off, the negative impulses will be eliminated.

The cathode 344 of the tube 341 may be connected to ground, while the anode 345 may be given a positive potential through a resistance 346. The other end of the resistance 346 may be connected to a movable arm 347 on a resistance 348, one end of which may be connected to the positive source of potential, indicated at 349, and the other end 350 may be grounded, as indicated. A condenser 351 may be connected between the anode 345 and a resistance 352, the other end of which may be connected to ground. This arrangement produces the saw-tooth wave, as already described, which may be taken off across the resistance and condenser.

It will be noted that the thirty cycles applied to the tubes 331 and 332, by virtue of the push-pull input connection and the parallel output connection, will produce sixty impulses on the grid of the tube 341, which, when applied to the saw-tooth maker, creates the sixty cycle saw-tooth wave for the vertical deflection circuits.

Figure 5:
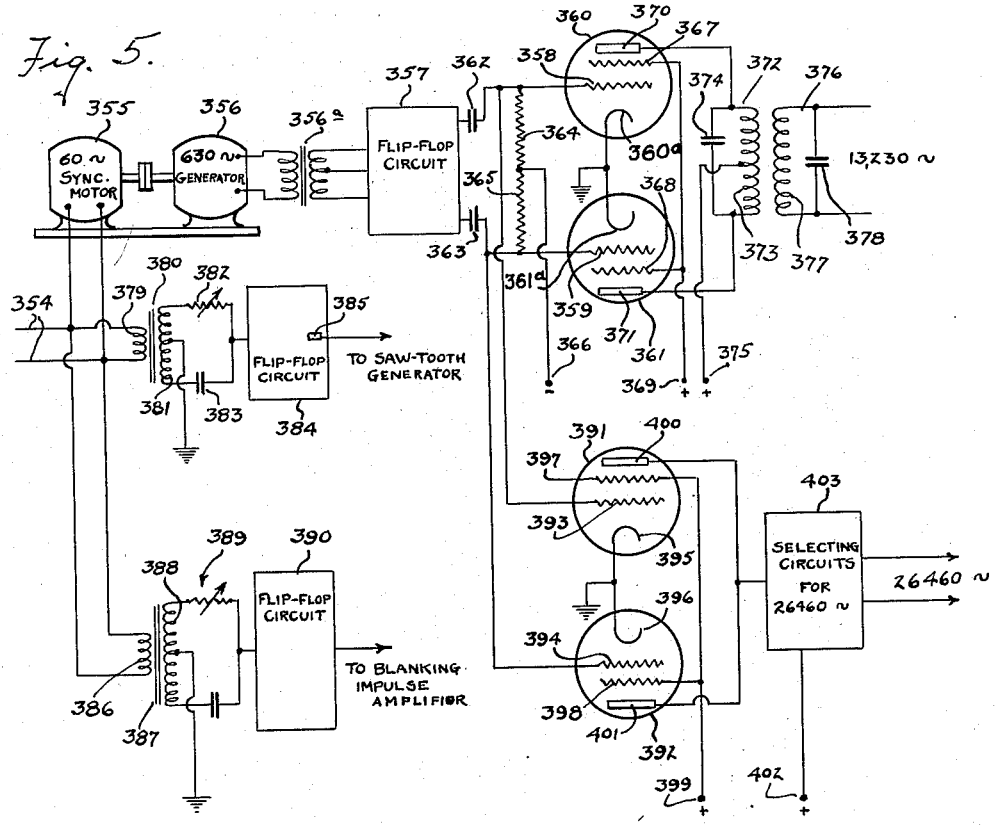
Figs. 5 and 6 are circuit diagrams of still other modified forms of the synchronizing signal generator of Fig. 1.

In Fig. 5 I have shown another modified form of the synchronizing signal generator. In this modification the synchronous motor 355, adapted to operate, for the example illustrated, on sixty cycle alternating current, is arranged to drive a generator 356 which is designed to produce oscillations at a frequency of 630 cycles per second when driven at the predetermined speed of the motor 355. These oscillations at 630 cycles may be introduced in push-pull by means of the transformer 356a to the flip-flop circuit 357 which may be similar to the push-pull flip-flop circuits described in connection with the other figures, and the square-topped wave output of this flip-flop circuit may be applied to the grids 358 and 359 of the tubes 360 and 361 through condensers 362 and 363. Resistances 364 and 365 may be connected respectively, between the grids 358 and 359 and a source of negative potential 366 which may be such as to hold the tubes 360 and 361 at cut-off.

The condensers and resistances may differentiate as before so that sharp impulses are produced both positive and negative; the negative ones being eliminated by a suitable value of the negative potential 366 which holds the tubes at cut-off. The tubes 360 and 361 may have screens 367 and 368 which may be connected together and to a suitable source of positive potential indicated at 369. The cathodes 360a and 361a of the tubes may be connected together and to ground as indicated. The anodes 370 and 371 of the tubes 360 and 361 may be connected to opposite ends of a resonant circuit 372 which may comprise a coil 373 and a condenser 374, shunted across it, and the midpoint of the coil may be connected to a source of positive potential indicated at 375.

The resonant circuit 372 may be tuned to an odd harmonic of the 630 cycle fundamental as, for instance, 13,230 cycles, which will then be produced in the circuit 372 by the impulses coming from the tubes 360 and 361. Another resonant circuit 376, comprising a coil 377 and a condenser 378, may be coupled to the resonant circuit 372 for providing additional selectivity.

With this arrangement I may take the sixty cycle alternating current from the line 354 and use it to produce the saw-tooth wave for the sixty cycle vertical deflection. To this end I may lead the alternating current to the primary 379 of a transformer 380, the secondary 381 of which may form part of a phase-adjusting network comprising the variable resistance 382 and the condenser 383, both in series with the coil 381. The midpoint of the coil may be connected to ground and the juncture of the resistance and condenser may then be connected to a single tube flip-flop circuit 384, the output anode 385 of which, carrying the sixty cycle square-topped wave, may be applied to a suitable saw-tooth generator (not shown) for producing the sixty cycle vertical deflection sawtooth wave.

The blanking-out impulses which may be applied to the signal between the successive scannings of the picture field, may also be produced from the sixty cycle alternating current. To this end I may connect the primary 386 of a transformer 387 to the alternating current power lines 354, the secondary 388 of the transformer being included in a phasing circuit 389 similar to the circuit 382 described above. The output of this phasing circuit may be connected to a single tube flip-flop circuit 390 which may translate the sine wave of the sixty cycle to the square-topped wave. This single tube flip-flop may then be connected to a suitable blanking impulse amplifier (not shown).

It may be desirable also, in the production of a television picture, to provide an oscillation at the frequency of the second harmonic of the picture line frequency, in order to produce certain shading effects on the picture, which will be understood by one skilled in the art. Accordingly, I may use the 630 impulses per second which are applied to the grids of the tubes 360 and 361 in another circuit including the tubes 391 and 392. Thus the control grid 393 of the tube 391 may be directly connected to the grid 358 of the tube 360 and the control grid 394 of the tube 392 may be directly connected to the grid 359 of the tube 361. The cathodes 395 and 396 of the tube may be connected together and to ground, as indicated. Also screen grids 397 and 398 of the tubes 391 and 392, respectively, may be connected together and to a source of positive potential, indicated at 399. The anodes 400 and 401 of the tubes 391 and 392 may be connected together and to a source of positive potential indicated at 402 through a suitable frequency selecting circuit 403 which may be arranged to select the frequency of 26,460 cycles, which is the second harmonic of the picture line frequency of 13.230 cycles per second.

It will be seen that inasmuch as the anodes of the tubes 391 and 392 are connected in parallel, the impulses produced in the anode circuit will all be in the same direction as explained in connection with the sixty cycle saw-tooth circuit of Fig. 4, so that the even harmonics will be amplified or increased and the odd harmonics will be suppressed. The final frequency obtained by the selecting circuit 403 will therefore be an even harmonic of the 630 cycle wave produced by the generator 356, or in the case under consideration, the forty-second harmonic.

Figure 6:
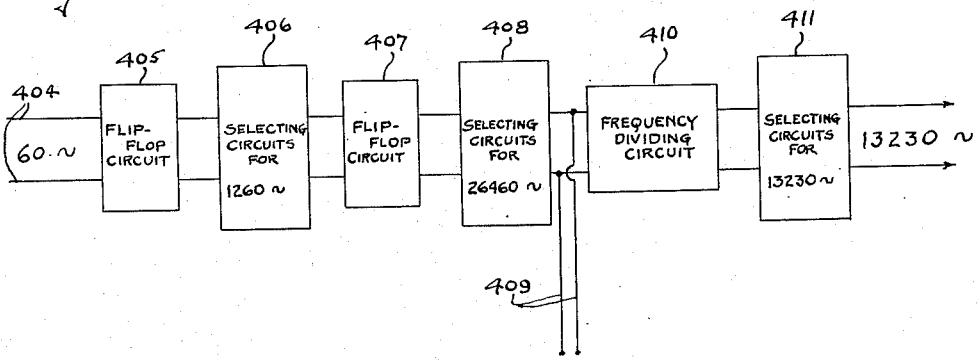

Still another modified form of my improved signal generator is illustrated in Fig. 6 in which the sixty cycle alternating current is used alone for the initiating oscillations. Thus the sixty cycle alternating current mains 404 may be applied to a first flip-flop circuit 405 which may be connected in push-pull, so that a square-topped wave is produced. The output of this circuit may be differentiated and applied to suitable tuned circuits 406, which may be tuned to select an odd harmonic of the sixty cycles, or, in the present instance, a frequency of 1260 cycles per second. These oscillations may in turn be applied to a second flip-flop circuit 407 which will produce a square-topped wave at 1260 cycles. This wave may in turn be differentiated and applied to a suitable selecting circuit 408 which may be tuned to select a twenty-first harmonic of the 1260 cycles, or 26,460 cycles.

The output of this selecting circuit may be carried by means of a line 409 to the shading amplifiers (not shown), as these oscillations correspond to the second harmonic of the picture line frequency. This frequency of 26,460 cycles may also be applied to a frequency-dividing circuit 410, which may be any of the well known circuits for that purpose, such as a multi-vibrator, so as to produce the 13,230 cycles necessary for the picture line frequency. These oscillations may then be delivered to a selecting circuit 411 for selecting a substantially pure sine wave which may be fed to a saw-tooth generator (not shown) for producing the horizontal saw-tooth deflection wave.

The synchronizing signal generator described in connection with Figs. 1 to 6 inclusive may be used for any television system where oscillations at several different frequencies are necessary to control the apparatus, and especially where such oscillations are necessarily locked together in time relation. One such television system has been diagrammatically illustrated in Fig. 7 where a cathode ray camera tube 420 is shown with its output connected to a preamplifier 421 which feeds the video amplifier 422. The output of the video amplifier is shown connected to a video transmitter 423 which is provided with an antenna 424.

The synchronizing signal generator 425 may be similar to any one of the various generators already described, and may be arranged to provide oscillations at 60 cycles, 120 cycles, 13,230 cycles, 26,460 cycles and a suitable oscillation for transmitting a synchronizing signal. These oscillations may emerge in sine wave form from the signal generator on leads 426, 427, 428, 429 and 430 in the order named, and the oscillations may be led to any desired point at the transmitting station from the signal generator in ordinary wires, without particular pains being taken to eliminate distortion, as would be the case if sharp impulses or saw-tooth waves were transmitted from the synchronizing signal generator to the point of use. The synchronizing signal generator may thus be positioned at some point in the transmitting station where the space it occupies does not interfere with the operation and maintenance of the other apparatus.

The camera tube 420 may have horizontal magnetic deflection coils 431 and vertical magnetic deflection coils 432, which, it will be understood, are used to control the movement of the beam of electrons. A saw-tooth-making circuit 433, including a flip-flop circuit, as, for instance, described in connection with the tube 141 and the circuits immediately following that tube in Fig. 1, may be energized by the 13,230 cycle oscillation from the lead 428 and may be connected to the coil 431 so that the coil is supplied with a saw-tooth wave at a frequency of 13,230 cycles. The unit 433 may also include a phasing adjustment, as already described in connection with some of the other circuits.

In the same manner the vertical coil 432 may be energized by means of a saw-tooth-making circuit 434 which may be connected to the sixty cycle oscillation from the lead 426, and may include a flip-flop circuit and a saw-tooth-making circuit as well as the phasing adjustment referred to in connection with the other. This will supply a sixty cycle saw-tooth wave to the vertical coil 432.

It may be desirable to supply the grid 435 of the camera tube with a blanking-out impulse to increase the bias on the grid when the cathode ray beam is making its retrace, after each line of the picture as well as after each complete scanning, and I therefore may provide a blanking-out impulse generator 436, which may be connected to both the sixty cycle supply 426 and the 13,230 cycle supply 428. Such a circuit may include a flip-flop circuit with other suitable parts to produce the necessary blanking-out impulses which may be, for example, about one-tenth of the time required for the cathode ray beam to scan across the picture, as far as the horizontal blanking-out impulse is concerned, and one-tenth of the time to make a complete scanning for the vertical impulse. Phasing controls may also be included in the blanking-out impulse generator.

Another blanking-out impulse may be delivered to the video amplifier 422 by means of a blanking-out impulse generator 437 which may be supplied from the 60 cycle and 13,230 cycle mains 426 and 428, so that the signal from the camera tube may be blanked out during the retrace periods to eliminate any undesired transients which may be produced in the circuit at this time. Phasing adjustments for both frequencies may be included in this blanking-out generator.

Also, I may provide a shading amplifier 438, which I may connect to the video amplifier 422. This shading amplifier may be arranged to produce a plurality of sine waves as, for instance, 60 cycles, 120 cycles, 13,230 cycles, and 26,460 cycles, and also certain other variations, such as saw-tooth waves at 60 cycles and 13,230 cycles. These various waves may preferably be arranged for phasing through 360 degrees and controlled in amplitude so that they may be introduced into the amplifier to offset certain effects which may be produced in the signal by the action of the camera tube, or for other reasons. In order to supply the shading amplifier with suitable oscillations for energizing it I may connect it as indicated to the lines 426, 427, 428 and 429.

I may apply the synchronizing signal to the transmitter by means of a synchronizing signal circuit 439 which may be supplied by the synchronizing signal line 430. This synchronizing signal circuit has not been shown in detail, but may be arranged to provide synchronizing impulses at both the line frequency of 13,230 cycles and the picture frequency of 60 cycles which may be set up on the blanking-out impulses in a well known manner, or, it may be arranged to introduce a sine wave into the signal for synchronizing purposes, following one system which may be found desirable and which is diagrammatically illustrated in Fig. 8. Any of these synchronizing signals may be phased as already explained.

Figure 7:
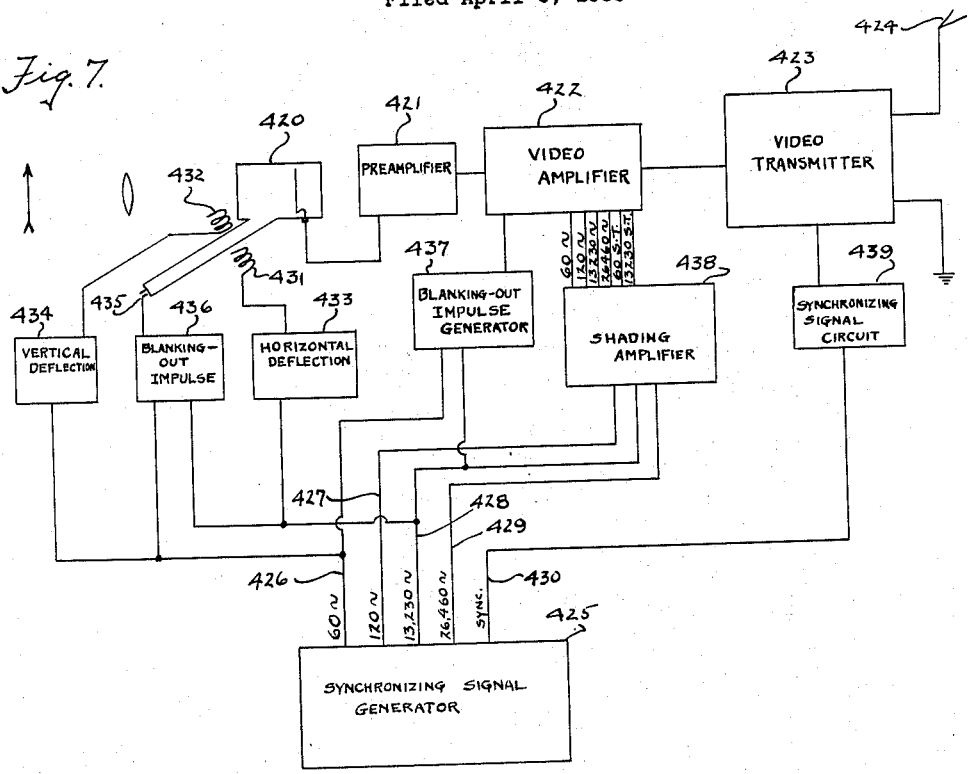
Fig. 7 is a block diagram representing a television transmitter.

The monitor apparatus which would be used at the transmitting station has not been shown in Fig. 7 but might receive its proper controlling oscillations from the synchronizing signal generator in the same manner as the transmitting apparatus.

Figure 8:
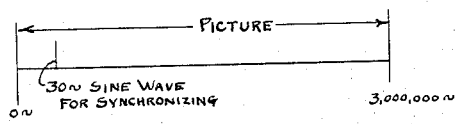
Fig. 8 is a diagram representing the transmission of a thirty cycle sine wave for synchronizing purposes mixed with the television signal.
Figure 9:
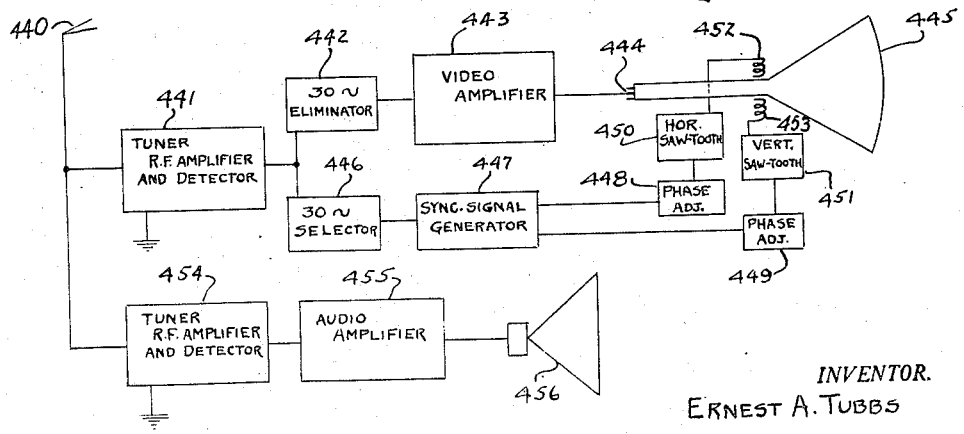
Fig. 9 is a block diagram of a television receiver for receiving the transmission of Fig. 8.

In Fig. 9 I have shown a receiver arranged to utilize the thirty cycle sine wave synchronizing signal illustrated in Fig. 8. In the receiver of Fig. 9 the entire signal is received by means of an antenna 440 and applied to a receiving circuit 441 which may include a tuner, a radio frequency amplifier and a detector stage. The amplified signal may then pass through a thirty cycle eliminator circuit 442, the function of which is to remove the thirty cycle wave from the signal in any desirable manner, whereupon the signal is delivered to the video amplifier 443 and thence directly to the grid 444 of the cathode ray tube 445.

The unit 441 may also deliver the entire signal to a thirty cycle selecting circuit 446, the function of which is to remove all but the thirty cycle oscillation from the signal and thence deliver this oscillation to a signal generator 447 which may correspond to the signal generator shown in Fig. 4, the thirty cycle oscillation being used to initiate the first flip-flop circuit 287 of Fig. 4. This signal generator will then produce a sixty cycle oscillation and a 13,230 cycle oscillation. These oscillations may then be delivered, respectively, to two phasing adjusters 448 and 449, and then to the saw-tooth makers 450 and 451. The saw-tooth waves produced by these saw-tooth-making circuits may then be delivered to the horizontal and vertical coils 452 and 453 for controlling the cathode ray beam in the tube 445.

I have discovered that the controls for phasing the saw-tooth waves serve as an excellent means for centering or framing the picture on the cathode ray tube, as the complete picture may be moved up and down or from side to side within certain limits depending on the width of the blank-out impulse. In order to accomplish this result without interfering with the quality of the picture the blanking-out impulse should be longer in time duration than the retrace time of the saw-tooth wave.

A separate tuner unit 454, which may also include a radio frequency amplifier and a detector circuit, may be used to select a sound accompaniment for the television picture which may be transmitted on another adjacent carrier. The unit 454 may be connected to an amplifier 455 which in turn may be connected to a loud speaker 456 to reproduce the sound accompaniment.

In Fig. 10 another system of transmitting the synchronizing impulses is illustrated diagrammatically. The picture signal itself may be sent on a carrier frequency 457 which will then contain the picture alone without any synchronizing impulses. Adjacent to the carrier 457 may be another carrier 458 which may be modulated with the sound accompaniment for the picture, this accompaniment having a limited band of frequencies as, for instance, between the limits of 100 cycles and 10,000 cycles per second. The synchronizing impulses are then mixed with the sound in sine wave form and may be any frequencies outside of the range reserved for the sound. Thus, a sixty cycle sine wave may be used for the frame frequency, and a 13,230 cycle sine wave may be used for the line frequency.

In Fig. 11 a television receiver for utilizing the system illustrated in Fig. 10 is shown. With this system the complete signal is received on an antenna 459 and delivered to a selecting circuit 460 which may also include an amplifier and detector for the picture carrier. The detected signal is then applied to a video amplifier 461 and thence to the grid 462 of the cathode ray tube 463. Inasmuch as there is nothing but the picture signal on the picture carrier, nothing but detection and amplification is necessary to deliver the signal to the grid of the tube.

Another signal selecting circuit 464 may also be connected to the antenna 459 and may include an amplifier and detector for the sound and synchronizing signal. A filter 465 may be connected to the selecting circuit 464 which is designed to select audio frequencies between 100 and 10,000 cycles, and these frequencies are then delivered to an amplifier 466 and thence to a loud speaker 467 where they are translated into sound.

Also, a filter unit 468, arranged to select out audio frequencies below 100 cycles may be connected to the selecting circuit 464, and such selected oscillations may be applied to a flip-flop circuit 469 which may include an amplifier and saw-tooth generator, the saw-tooth waves produced being led to the vertical deflecting coils 470 of the tube 463.

In order to obtain the line frequency, a filter unit 471 may also be connected to the selecting circuit 464 and may comprise a filter arranged to select frequencies above 10,000 cycles and to deliver such frequencies to a flip-flop circuit 472 which may include an amplifier and a saw-tooth generator, so that the saw-tooth wave produced thereby may be applied to the horizontal deflecting coils 473 of the tube 463.

With the arrangement just described the selecting circuit 460 may be tuned to the picture carrier and the picture signal will then be applied to the grid of the cathode ray tube. The selecting circuit 464 may then be tuned to the sound carrier and the sound reproduced in the speaker 467. At the same time, whatever frequency is used above 10,000 cycles for the line frequency, and below 100 cycles for the picture frequency will be selected by means of the filter circuits 468 and 471 and translated into saw-tooth waves to be applied to the deflecting coils. Thus with this system it will be possible for the receiver to automatically operate on substantially any picture frequency, within certain limits, below 100 cycles, and any line frequency within certain limits, above 10,000 cycles, there being no adjustments necessary in the receiver for different scanning rates.

With the circuit of Fig. 11 the receiver has two synchronizing signals, one to control the vertical movement of the cathode ray beam and the other to control the horizontal. I may desire in some instances to dispense with the sixty cycle synchronizing signal and obtain the sixty cycle sine wave directly from the alternating current power circuit, in which case the unit 468 would be eliminated and sixty cycle alternating current from the power line be introduced directly to the circuit 469 where it would operate the flip-flop circuit and saw-tooth maker included in that circuit. The successful operation of such an arrangement is made possible by the accurate locking of the synchronizing signals to the sixty cycle power lines at the transmitter.

Where it is desired to obtain the vertical deflecting frequency from the power lines it is obviously unnecessary to transmit this frequency either on the picture channel or on the sound channel, and the preferred system of transmission might then be to transmit a 13,230 cycle sine wave on the sound channel for the horizontal deflection, this being the only synchronizing signal transmitted. A receiver for use with such a system is illustrated in Fig. 12 in which the signal receiver on the antenna 475 may be selected and detected by unit 476, and the video signal amplified by the amplifier 477 and then delivered to the grid 478 of the cathode ray tube 479. At the same time a second selecting and detector circuit 480 may be tuned to the sound carrier and the sound signal delivered to an amplifier 481 and thence to a speaker 482. A selector circuit 483, which may comprise a coil and condenser combination tuned to 13,230 cycles, may select that frequency out of the sound and deliver it to a flip-flop circuit and saw-tooth generator 484, from which it may be applied to the horizontal deflecting coil 485 for the cathode ray tube.

The 110 volt, sixty cycle alternating current from the power supply mains may be applied to the primary of a transformer 486, the secondary of which may be connected to a flip-flop circuit and saw-tooth generator 487, and the output of this circuit may be connected to the vertical deflecting coils 488.

In the operation of this receiver the picture signal is received and amplified and applied to the grid of the cathode ray tube as before. The sound signal containing the 13,230 cycle sine wave may be detected, amplified and applied to the loud speaker exactly as it is, because the 13,230 cycle note is high enough so that it may not be objectionable, although it may be eliminated from the audible system by any suitable means, if desired. It is then a simple matter to select, by means of a tuned coil from this signal, the 13,230 cycle oscillation which then operates the flip-flop circuit for the horizontal deflection current. This receiver is therefore extremely simple inasmuch as the only selection necessary, except between the picture carrier and the sound carrier, is the 13,230 cycle oscillation.

Under certain conditions it might be desirable to synchronize solely from the power lines whereupon no 13,230 cycle oscillation would be transmitted with the picture or sound, but a signal generator, as, for instance, that shown in Fig. 6 may be used to produce the 13,230 cycle oscillation from the alternating current power circuit.

In the receivers as shown in Figs. 9, 11 and 12, I have shown separate selecting circuits for the sound and picture signals, but it may be desirable to accomplish the selection in the intermediate frequency where a superheterodyne is used. Any suitable arrangement for receiving and selecting the particular signal frequency is intended to be included in the invention.

From the above description it will be seen that I have provided a television synchronizing system which has certain advantages over the prior art. In the first place, the synchronizing signal generator may be locked with the frequency of the sixty cycle alternating current power mains by means of the synchronous motors shown in Figs. 1, 4 and 5, or the arrangement of Fig. 6, where the initiating energy is taken directly from the power mains. This permits a much more accurate control of the frequencies necessary at the transmitter, and reduces to a large extent certain problems connected with hum in the television picture. It also permits the receiver to synchronize on the power line frequency, wherever the receiver is used with the same alternating current power supply system as the transmitter or one which is synchronized with it, as is becoming common practice today.

The system also permits greater flexibility of the spacing of the apparatus in a transmitting station as the various signals may be carried from point to point in the form of sine wave oscillations. The latter condition makes it possible to phase all of the signals very accurately with respect to each other and with respect to the fundamental, and greatly adds to the control facilities of the system. The synchronizing signal generator itself may be used with any system of television or wherever oscillations of different frequencies are required with accurate timing relation between them.

The accurate spacing of the various oscillations produced, especially the sixty cycle for the vertical movement of the beam with respect to the 13,230 cycle horizontal line frequency, insures accurate interlacing of alternate pictures, and this accurate interlacing is always completely under control. For instance, with the arrangement shown in Fig. 1 it has been stated that the brushes 13 and 14 on the motor generator unit 10 should be accurately positioned 180 degrees apart in order to produce the proper timing for the sixty cycle saw-tooth. I have found that one of the best ways to check this spacing of the brushes is to watch a television picture and move one of the brushes circumferentially with respect to the other. When the brushes are positioned at exactly 180 degrees the interlacing will be perfect. An adjustment of one of the brushes, however, in either direction will cause one series of pictures to move vertically with respect to the other series, so that the interlaced lines are not evenly spaced but may even pair with each other.

The flip-flop circuits described form an extremely accurate method of producing higher frequencies and of locking such frequencies to the fundamental. It is inherently a non-oscillating circuit and therefore has no tendency to cause a jump from one harmonic to another, as is the case with controlled oscillators, such as multivibrators. As far as its frequency response is concerned the flip-flop circuit acts very similarly to a resistance-coupled amplifier and the same considerations should be given in designing a flip-flop circuit for high frequency response as would be given an amplifier.

In all of the various circuits shown and described I have simplified the drawings by merely indicating the sources of potential, and it should be understood that, wherever such sources are shown with merely a positive or negative symbol, the other side of the source is connected to ground. Also, I have shown no heater filaments for the cathodes of the tubes, but it will be understood that such filaments would, of course, be necessary where heater type tubes are used.

Many other types of tubes may be used in the circuits shown, the particular tubes being selected merely for the purpose of illustration. Also, the circuit arrangements shown are subject to great variation, many of the units being interchangeable with others and adapted for connection in different sequence than that shown. For instance, the phasing controls may be inserted in any part of the circuit where the oscillations are in substantially sine wave form. I do not, therefore, wish to be limited to the circuits shown and described except by the limitations included in the appended claims.

It should be noted that certain aspects of my invention herein disclosed, but not claimed, are disclosed in my co-pending application, Ser. No. 200,338, filed concurrently herewith, and claimed therein.

What I claim is:

1. A television system comprising a television camera having means to scan an object field a predetermined number of times per second, means to translate the light variations produced thereby into electrical variations, a receiver, means to transmit said electrical variations from said camera to said receiver, means to simultaneously transmit from said camera to said receiver a synchronizing signal at a frequency below the picture scanning rate, and means to utilize said signal for synchronizing said receiver, said means comprising a chain of flip-flop circuits arranged to be driven by the received synchronizing signal and to multiply the frequency thereof to produce the receiving synchronizing pulses.

2. A television system comprising a television camera, a receiver, means to transmit picture signals from said camera to said receiver, means to transmit oscillations in substantially sine wave form from said camera to said receiver for synchronizing purposes, said oscillations being mixed with the picture signal, and means to accurately synchronize said receiver with said oscillations, said means comprising a chain of flip-flop circuits arranged to be driven by the received synchronizing signal and to multiply the frequency thereof to produce the receiving synchronizing pulses.

3. A television system comprising means to produce electrical oscillations corresponding to a video signal, means to produce electrical oscillations corresponding to a sound accompaniment for said video signal, said means being limited to producing oscillations having a frequency lying within a predetermined band, means for producing a synchronizing signal having a frequency lying outside of said band, means for combining said synchronizing signal and said electrical oscillations corresponding to said sound accompaniment, means for producing two carrier waves of different frequency, means for modulating one of said carrier waves with the first set of oscillations and means for modulating the second carrier with said second set of oscillations mixed with said synchronizing signal.

4. A television system comprising means to produce electrical oscillations corresponding to a video signal, means to produce electrical oscillations corresponding to a sound accompaniment for said video signal, said means being limited to producing oscillations having a frequency lying within a predetermined band, means for producing a synchronizing signal of sine wave form and having a frequency lying outside of said band, means for combining said synchronizing signal and said electrical oscillations corresponding to said sound accompaniment, means for producing two carrier waves of different frequency, means for modulating one of said carrier waves with the first set of oscillations and means for modulating the other with said second set of oscillations mixed with said synchronizing signal.

5. A television transmitter comprising means to scan an object field, means to control the operation of said scanning means in one direction, means to control the operation of said scanning means in another direction, a signal generator comprising a chain of flip-flop circuits arranged to multiply frequency for producing oscillations at predetermined frequencies, means to deliver said oscillations to said control means in substantially sine wave form and means comprising a flip-flop circuit for producing a saw-tooth wave.

6. A television transmitter comprising means to scan an object field, means to control the operation of said scanning means in one direction, means to control the operation of said scanning means in another direction, a flip-flop circuit, means to energize said flip-flop circuit with an oscillation at a relatively low frequency, means to utilize said low frequency oscillation to operate one of said control means, means to select a harmonic of the said oscillation from the output of said flip-flop circuit, and means to utilize said harmonic to maintain the other of said control means in fixed predetermined time relation with said first control means.

7. A television transmitter comprising a scanning apparatus, a rotary oscillation generator, a chain of circuits including a flip-flop circuit associated with said generator and adapted to select and amplify a higher harmonic of the frequency of the oscillations produced by said generator, and means to utilize said oscillations thus produced to control said scanning apparatus.

8. A television transmitter comprising a scanning apparatus, a rotary oscillation generator, a synchronous motor to drive said generator, said motor being operated on the alternating current power line, means to control one direction of scanning of said scanning apparatus at the frequency of the alternating current power supply, a chain of circuits including a flip-flop circuit adapted to select and amplify a harmonic of the frequency of the oscillations produced by said generator, means to utilize the oscillations thus produced to control said scanning apparatus in another direction, and means to adjust the phase relation between the oscillations of the power supply circuit and the oscillations produced by said chain of circuits.

9. A synchronizing generator for television comprising a source of low frequency oscillations and a chain of circuits for multiplying the original frequency, said chain of circuits comprising flip-flop circuits arranged to produce frequency multiplication in steps of odd multiples exceeding four.

10. A television receiver comprising means to intercept a transmitted signal, means to utilize a predetermined band of said signal to produce variations of light for a picture, means to amplify oscillations of a predetermined frequency within said band, and means including a flip-flop circuit to utilize such oscillations for synchronizing purposes.

11. A television receiver comprising means to intercept a transmitted signal, means to produce a cathode ray beam, means to utilize variations of said signal to control the intensity of said cathode ray beam, a flip-flop circuit, means to energize said flip-flop circuit by synchronizing impulses contained in said intercepted signal, means to control the movement of said cathode ray beam in one direction by said flip-flop circuit, a second flip-flop circuit, means to energize said second flip-flop circuit by other synchronizing impulses included in said signal, and means to control the movement of said electron beam in another direction by said second flip-flop circuit.

12. A television system comprising a television camera, a receiver, means to transmit picture signals from said camera to said receiver, means to transmit a sound signal from said transmitter to said receiver, means to include in said sound signal a substantially sine wave oscillation corresponding in frequency to the picture scanning frequency and a substantially sine wave oscillation corresponding in frequency to the line frequency, and means at the receiver to utilize said oscillations for synchronizing purposes, said means comprising a chain of flip-flop circuits arranged to be driven by the received synchronizing signal and to multiply the frequency thereof to produce the receiving synchronizing pulses.

13. A television system comprising means to produce electrical oscillations corresponding to a video signal, means to produce electrical oscillations corresponding to a sound accompaniment for said video signal, said means being limited to producing oscillations having a frequency lying within a predetermined band, means for producing a synchronizing signal having a frequency lying outside and below said band, means for combining said synchronizing signal and said electrical oscillations corresponding to said sound accompaniment, means for producing two carrier waves of different frequency, means for modulating one of said carrier waves with the first set of oscillations and means for modulating the other with said second set of oscillations mixed with said synchronizing signal.

14. A television receiving system for producing an image from received signals including video signals and synchronizing signals, said system comprising means to produce a variable cathode ray beam for scanning, a flip-flop circuit, means to control said flip-flop circuit from the scanning impulses in the received signal, and means fed from the output of said flip-flop circuit to produce a saw-tooth scanning wave.

15. A television receiving system for producing an image from received signals including video signals and synchronizing signals, said system comprising means for producing a variable cathode ray beam for scanning a receiving screen, a flip-flop circuit, means for selecting the synchronizing signals from the received signals and applying said synchronizing signals to said flip-flop circuit to control the same, means fed from the output of said flip-flop circuit to produce a saw-tooth scanning wave, and means for utilizing said saw-tooth scanning wave to control the deflection of said cathode ray beam.

16. A television receiving system for producing an image from received signals comprising video, line synchronizing, and frame synchronizing signals, said system comprising means for producing a variable cathode ray beam for scanning a receiving screen, a first flip-flop circuit, means for selecting and applying the line synchronizing signals to said first flip-flop circuit to control the output of the same, a second flip-flop circuit, means for selecting and applying the frame synchronizing signals to said second flip-flop circuit to control the output of the same, means associated with the output of each of said flip-flop circuits respectively for producing sawtooth line and frame scanning waves respectively, and means for utilizing said scanning waves to control the position of said cathode ray beam.

17. A television receiver for producing an image from signals including video and synchronizing signals, said receiver comprising means for selecting and utilizing the video portion of the received signal to produce variations of light, means for selecting the synchronizing portion of the received signals, and means including a flip-flop circuit for utilizing said synchronizing signals for synchronizing purposes.

18. A television receiver for producing an image from received signals including video signals and line and frame synchronizing signals, said receiver comprising means for selecting and utilizing the video portion of the received signal to produce variations of light, means for selecting the line synchronizing signals, means including a first flip-flop circuit for utilizing said line synchronizing signals for line synchronizing purposes, and means including a second flip-flop circuit for utilizing said frame synchronizing signals for frame synchronizing purposes.

ERNEST A. TUBBS.